US012541307B2

(12) United States Patent
Cermak et al.

(10) Patent No.: US 12,541,307 B2
(45) Date of Patent: Feb. 3, 2026

(54) FLEXIBLE AND LOW POWER CACHE MEMORY ARCHITECTURE

(71) Applicant: Ambiq Micro, Inc., Austin, TX (US)

(72) Inventors: Daniel Martin Cermak, Austin, TX (US); Stephen James Sheafor, Austin, TX (US)

(73) Assignee: Ambiq Micro, Inc., Austin, TX (US)

( * ) Notice: Subject to any disclaimer, the term of this patent is extended or adjusted under 35 U.S.C. 154(b) by 0 days.

(21) Appl. No.: 18/053,610

(22) Filed: Nov. 8, 2022

(65) Prior Publication Data

US 2023/0148253 A1    May 11, 2023

Related U.S. Application Data

(60) Provisional application No. 63/277,159, filed on Nov. 8, 2021.

(51) Int. Cl.
| | | |
|---|---|---|
| *G06F 12/00* | (2006.01) | |
| *G06F 3/06* | (2006.01) | |
| *H03M 1/12* | (2006.01) | |
| *H03M 1/18* | (2006.01) | |
| *H03M 1/46* | (2006.01) | |

(52) U.S. Cl.
CPC .......... *G06F 3/0625* (2013.01); *G06F 3/0659* (2013.01); *G06F 3/0679* (2013.01); *H03M 1/1205* (2013.01); *H03M 1/183* (2013.01); *H03M 1/462* (2013.01)

(58) Field of Classification Search
CPC .... G06F 3/0625; G06F 3/0659; G06F 3/0679; G06F 15/7807; H03M 1/1205; H03M 1/183; H03M 1/462; Y02D 10/00
See application file for complete search history.

(56) References Cited

U.S. PATENT DOCUMENTS

| | | |
|---|---|---|
| 4,350,975 A | 9/1982 | Haque |
| 5,963,843 A | 10/1999 | Sit |
| 6,476,745 B1 | 11/2002 | Evans |
| 6,748,200 B1 | 6/2004 | Webster |
| 8,386,723 B2 * | 2/2013 | Bryant-Rich ........... G06F 12/06 711/103 |
| 9,680,931 B1 * | 6/2017 | Karnowski ........... G06F 3/0611 |
| 9,703,313 B2 | 7/2017 | Sheafor |
| 9,772,648 B2 | 9/2017 | Sheafor |

(Continued)

FOREIGN PATENT DOCUMENTS

EP        2972915 B1 *   9/2019    ......... G06F 12/0223

*Primary Examiner* — Shawn X Gu
*Assistant Examiner* — Mohammad S Hasan
(74) *Attorney, Agent, or Firm* — NIXON PEABODY LLP

(57) ABSTRACT

A low power caching architecture is disclosed. The architecture includes multiple data memory regions, each including a cache memory. The data memory regions are coupled to a peripheral device. A host processor is operable to control power to each of the plurality of data memory regions. The host processor is operable to power on any of data memory regions and power down any unused data memory regions of the data memory regions. A cache control logic is operable to receive a data request from the host processor. The cache control logic requests the data from the peripheral. The host processor powers on at least one of the data memory regions, and stores the requested data in the cache memory of the powered on data memory region.

19 Claims, 8 Drawing Sheets

(56) References Cited

U.S. PATENT DOCUMENTS

| | | | |
|---|---|---|---|
| 9,880,583 B2 | 1/2018 | Sheafor | |
| 9,939,839 B2 | 4/2018 | Sheafor | |
| 10,338,632 B2 | 7/2019 | Hanson | |
| 10,489,069 B2 * | 11/2019 | Carlough | G06F 13/1673 |
| 10,578,656 B2 | 3/2020 | Hanson | |
| 10,754,414 B2 | 8/2020 | Hanson | |
| 11,790,931 B2 | 10/2023 | Serwy | |
| 2006/0044170 A1 | 3/2006 | Boemler | |
| 2006/0149911 A1 * | 7/2006 | Kimelman | G06F 12/1441 |
| | | | 711/163 |
| 2010/0250856 A1 * | 9/2010 | Owen | G06F 12/084 |
| | | | 711/135 |
| 2011/0080925 A1 | 4/2011 | Molina | |
| 2012/0084589 A1 * | 4/2012 | Millet | G06F 1/3287 |
| | | | 713/323 |
| 2012/0131261 A1 * | 5/2012 | Ferrari | G06F 12/0246 |
| | | | 711/135 |
| 2012/0303897 A1 * | 11/2012 | Pullagoundapatti | |
| | | | G06F 12/0864 |
| | | | 711/171 |
| 2014/0059371 A1 * | 2/2014 | Kitchin | G06F 12/0804 |
| | | | 713/323 |
| 2014/0101370 A1 * | 4/2014 | Chu | G06F 12/0223 |
| | | | 711/E12.008 |
| 2014/0122824 A1 * | 5/2014 | Lewsey | G06F 12/02 |
| | | | 711/170 |
| 2014/0136870 A1 * | 5/2014 | Breternitz | G06F 1/3225 |
| | | | 713/323 |
| 2014/0208144 A1 * | 7/2014 | Ma | G06F 1/3287 |
| | | | 713/324 |
| 2015/0237583 A1 | 8/2015 | Hassan | |
| 2017/0053689 A1 * | 2/2017 | Noguchi | G06F 12/06 |
| 2017/0206031 A1 * | 7/2017 | Yin | G06F 1/3225 |
| 2018/0293011 A1 * | 10/2018 | Schluessler | G06F 12/0223 |
| 2018/0349266 A1 * | 12/2018 | Canepa | G06F 11/10 |
| 2019/0042157 A1 * | 2/2019 | Bonen | G06F 13/1668 |
| 2019/0146695 A1 * | 5/2019 | Kim | G06F 3/0673 |
| | | | 713/330 |
| 2022/0130405 A1 | 4/2022 | Serwy | |
| 2022/0342729 A1 * | 10/2022 | Cai | G06F 9/544 |
| 2024/0128981 A1 | 4/2024 | Kobayashi | |

* cited by examiner

FLEXIBLE AND LOW POWER CACHE MEMORY ARCHITECTURE

PRIORITY CLAIM

The present disclosure claims the benefit of and priority to U.S. Provisional Ser. No. 63/277,159, filed Nov. 8, 2021. The contents of that application are hereby incorporated in their entirety.

TECHNICAL FIELD

The present disclosure relates generally to system on chip microcontrollers. More particularly, aspects of this disclosure relate to a very low power microcontroller system including a low power analog-to-digital converter; a negative temperature coefficient buck converter; low power component; security components; and energy monitoring components.

BACKGROUND

In recent years, due to the growth of portable electronics, there has been a push to decrease the power used by microcontrollers (or "MCU"), microprocessors, application processors, digital signal processors (DSPs), neural processing units (NPUs), and other circuits used in portable electronic appliances. With lower power requirements, effective electronics operation time can be extended, or alternatively, smaller batteries can be used. Commonly, the power consumption of a microcontroller and associated circuits may be reduced by using a lower supply voltage, or by reducing the amount of internal capacitance being charged and discharged during the operation of the circuit.

One method for reducing microcontroller power relies on hardware or software-based power mode switching. Power modes can be selected for microcontroller components or resources based on operating state, operating conditions, and/or sleep cycle characteristics and other factors to configure low power modes for selected microcontroller components at the time the processor enters a low power or sleep state. In some systems, a set of predefined low power configurations can be used, while more sophisticated systems can dynamically select low power configurations to maximize power savings while still meeting system latency requirements.

However, even with available low power modes, microcontroller power usage can be adversely affected by interactions with connected sensors, memory systems, or other peripherals. Frequent interrupts or requests for service from such peripherals can greatly limit the time a microcontroller can remain in a low power mode. Systems that provide a reliable overall power management protocol and components for very low power operation are still needed.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter; nor is it intended to be used in isolation to determine the scope of the claimed subject matter. The subject matter should be understood by reference to appropriate portions of the entire specification of this disclosure, any or all drawings and each claim.

One disclosed example is a system on chip including a peripheral interface coupled to a peripheral device storing data. The system on chip includes data memory regions each including a cache memory and each coupled to the peripheral device. A host processor is operable to control power to each of the plurality of data memory regions. the host processor is operable to power on any of the plurality of data memory regions and power down any unused data memory regions of the plurality of data memory regions. A cache control logic is operable to receive a data request from the host processor. The cache control logic requests the data from the peripheral device. The host processor powers on at least one of the data memory regions and stores the requested data in the cache memory of the powered on data memory region.

In another disclosed implementation of the example system on chip, the peripheral device, the host processor, control logic and memory regions are on a chip. In another disclosed implementation, the peripheral device is external to a chip holding the host processor, control logic, peripheral interface, and plurality of memory regions. In another disclosed implementation, the peripheral device is an internal system memory storing the data. In another disclosed implementation, the peripheral device is an external memory device. In another disclosed implementation, the other data memory regions are powered down by the host processor. In another disclosed implementation, the peripheral device includes a map associating the peripheral device to one of the data memory regions. In another disclosed implementation, the map is changed to associate the peripheral device to another one of the plurality of data memory regions. In another disclosed implementation, the change occurs based on the utilization of the memory region by the peripheral device. In another disclosed implementation, the peripheral device is one of a random access memory (RAM), a nonvolatile memory (NVM), or a solid state drive (SSD).

Another disclosed example is a method of selectively powering cache memories in data memory regions. Each of the data memory regions include a cache memory and is coupled to a peripheral device. A data request is requested from a host processor. Requested data is transferred from the peripheral device to the host processor. At least one of the data memory regions is powered on via control logic. The requested data is stored on the cache memory of the powered data memory region.

In another disclosed implementation of the example method, the peripheral device, the host processor, control logic and memory regions are on a chip. In another disclosed implementation, the peripheral device is external to a chip holding the host processor, control logic, peripheral interface, and plurality of memory regions. In another disclosed implementation, the peripheral device is an internal system memory storing the data. In another disclosed implementation, the peripheral device is an external memory device. In another disclosed implementation, the example method includes powering down other data memory regions. In another disclosed implementation, the peripheral device includes a map associating the peripheral device to one of the data memory regions. In another disclosed implementation, the example method includes changing the map to associate the peripheral device to another one of the data memory regions. In another disclosed implementation, the change occurs based on the utilization of the memory region by the peripheral device. In another disclosed implementation, the peripheral device is one of a random access memory (RAM), a non-volatile memory (NVM), or a solid state drive (SSD).

Another disclosed example is a non-transitory computer readable medium having stored thereon software instructions that, when executed by control logic, cause the control logic to receive a data request from a host processor and transfer requested data from a peripheral device to the host processor. The software instructions further cause the control logic to power on at least one of a plurality of data memory regions. Each of the plurality of memory regions include a cache memory, and wherein each of the data memory regions are coupled to a peripheral device. The software instructions further cause the control logic to store the requested data on the cache memory of the at least one powered data memory region.

BRIEF DESCRIPTION OF THE DRAWINGS

The disclosure will be better understood from the following description of exemplary embodiments together with reference to the accompanying drawings, in which.

Figure 1A:
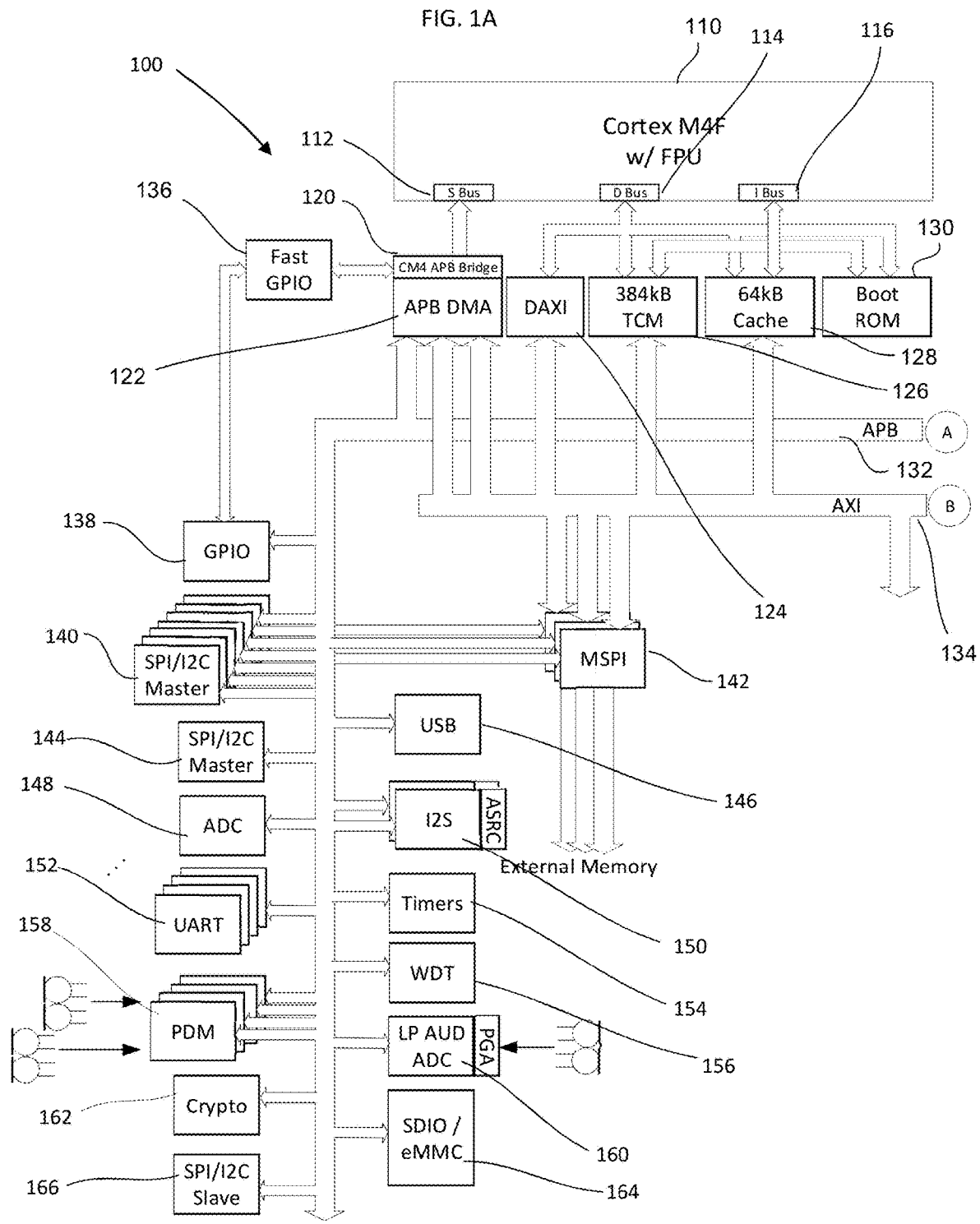
FIG. 1A-1B is a block diagram of the example low power microcontroller system.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION OF THE ILLUSTRATED EMBODIMENTS

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

The present disclosure is directed toward an example low power microcontroller system. The example microcontroller system includes a low power and wide dynamic range analog-to-digital converter. A negative temperature coefficient buck converter rail using a 1T subthreshold voltage reference is also provided. The microprocessor on the example low power microcontroller system includes an embedded secure boot and cryptographic function. A low power and high performance serial interface is provided. The example microcontroller system also includes a flexible and low power cache memory architecture.

Figure 1B:
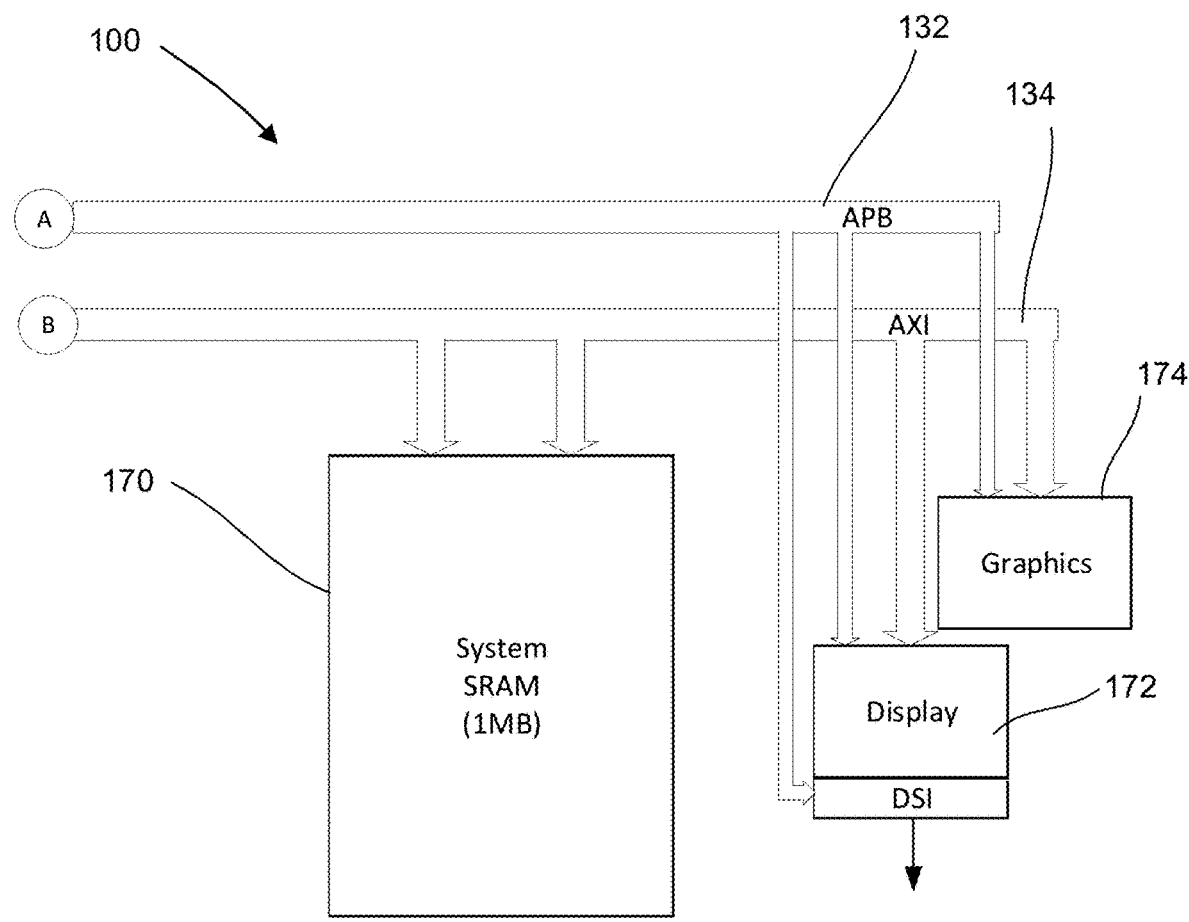

FIGS. 1A-1B are a block diagram of an example low power microcontroller system 100. The example low power microcontroller system 100 includes a central processing unit (CPU) 110. The CPU 110 in this example is Cortex M4F (CM4) with a floating point unit. The CPU 110 includes a System-bus interface 112, a Data-bus interface 114, an Instruction-bus) interface 116. It is to be understood, that other types of general CPUs, or other processors such as DSPs or NPUs may incorporate the principles described herein.

The System-bus interface 112 is coupled to a Cortex CM4 advanced peripheral bus (APB) bridge 120 that is coupled to an advanced peripheral bus (APB) direct memory access (DMA) module 122. The microcontroller system 100 includes a Data Advanced eXtensible Interface (DAXI) 124, a tightly coupled memory (TCM) 126, a cache 128, and a boot ROM 130. The Data-bus interface 114 allows access to the DAXI 124, the TCM 126, the cache 128, and the boot read only memory (ROM) 130. The Instruction-bus interface 116 allows access to the TCM 126, the cache 128, and the boot ROM 130. In this example, the DAXI interface 124 provides write buffering and caching functionality for the microcontroller system 100. The DAXI interface 124 improves performance when accessing peripherals like the SRAM and the MSPIs.

An APB 132 and an Advanced eXtensible Interface (AXI) bus 134 are provided for communication between components on the microcontroller system 100. The APB (Advanced Peripheral Bus) is a low speed and low overhead interface that is used for communicating with peripherals and registers that don't require high performance and don't change often (e.g., when a controller wants to set configuration bits for a serial interface. The AXI bus 134 is an ARM standard bus protocol that allows high speed communications between multiple masters and multiple busses. This is useful for peripherals that exchange a lot of data (e.g., a controller that talks to an ADC and needs to transfer ADC readings to a microcontroller or a GPU that talks to a memory and needs to transfer a large amount of graphics data to/from memories).

A fast general purpose input/output (GPIO) module 136 is coupled to the APB bridge 120. A GPIO module 138 is coupled to the fast GPIO module 136. The APB bus 132 is coupled to the GPIO module 138. The APB bus 132 is coupled to a series of Serial Peripheral Interface/Inter-Integrated Circuit (SPI/I2C) interfaces 140 and a series of Multi-bit Serial Peripheral Interfaces (MSPI)s 142. The MSPIs 142 are also coupled to the AXI bus 134 and provide access to external memory devices.

The APB bus 132 also is coupled to a SPI/I2C interface 144, a universal serial bus (USB) interface 146, an analog to digital converter (ADC) 148, an Integrated Inter-IC Sound Bus (I2S) interface 150, a set of Universal Asynchronous Receiver/Transmitters (UART)s 152, a timers module 154, a watch dog timer circuit 156, a series of pulse density modulation (PDM) interfaces 158, a low power audio ADC 160, a cryptography module 162, a Secure Digital Input Output/Embedded Multi-Media Card (SDIO/eMMC) interface 164, and a SPI/I2C slave interface module 166. The PDM interfaces 158 may be connected to external digital microphones. The low power audio ADC 160 may be connected to an external analog microphone through internal programmable gain amplifiers (PGA).

A system static random access memory (SRAM) 170, which is 1 MB in this example, is accessible through the AXI bus 134. The microcontroller system 100 includes a display interface 172 and a graphics interface 174 that are coupled to the APB bus 132 and the AXI bus 134.

Components of the disclosed microcontroller system 100 are further described by U.S. Provisional Ser. No. 62/557,534, titled "Very Low Power Microcontroller System," filed Sep. 12, 2017; U.S. application Ser. No. 15/933,153, filed Mar. 22, 2018 titled "Very Low Power Microcontroller System," (Now U.S. Pat. No. 10,754,414), U.S. Provisional Ser. No. 62/066,218, titled "Method and Apparatus for Use in Low Power Integrated Circuit," filed Oct. 20, 2014; U.S. application Ser. No. 14/855,195, titled "Peripheral Clock Management," (Now U.S. Pat. No. 9,703,313), filed Sep. 15, 2015; U.S. application Ser. No. 15/516,883, titled "Adaptive Voltage Converter," (Now U.S. Pat. No. 10,338,632), filed Sep. 15, 2015; U.S. application Ser. No. 14/918,406, titled "Low Power Asynchronous Counters in a Synchronous System," (Now U.S. Pat. No. 9,772,648), filed Oct. 20, 2015; U.S. application Ser. No. 14/918,397, titled "Low Power Autonomous Peripheral Management," (Now U.S. Pat. No. 9,880,583), filed Oct. 20, 2015; U.S. application Ser. No. 14/879,863, titled "Low Power Automatic Calibration Method for High Frequency Oscillators," (Now U.S. Pat. No. 9,939,839), filed Oct. 9, 2015; U.S. application Ser. No. 14/918,437, titled "Method and Apparatus for Monitoring Energy Consumption," (Now U.S. Pat. No. 10,578,656), filed Oct. 20, 2015; U.S. application Ser. No. 17/081,378, titled "Improved Voice Activity Detection Using Zero Crossing Detection," filed Oct. 27, 2020, U.S. application Ser. No. 17/081,640, titled "Low Complexity Voice Activity Detection Algorithm," filed Oct. 27, 2020, all of which are hereby incorporated by reference.

Low Power and Wide Dynamic Range Analog-to-Digital Converter

One aspect of the microcontroller system 100 is the low power and wide dynamic range audio ADC 160 in FIG. 1A. Battery-powered devices like smartwatches and headphones integrate an increasing number of sensors. Many of these sensors, like accelerometers and gyroscopes, integrate both transducer and analog-to-digital converter (ADC) and provide a digital output that can be sent to a host processor over a serial interface. Sometimes these sensors generate analog signals that must be converted to digital values by an ADC inside the host processor itself. In battery-powered devices, it is beneficial to use ADCs that require extremely little power to operate. Normally, achieving low power requires a compromise on other performance parameters like dynamic range. The example low power ADC 160 relates to ADC architectures and related algorithms that can simultaneously achieve both low power and high dynamic range.

Figure 2:
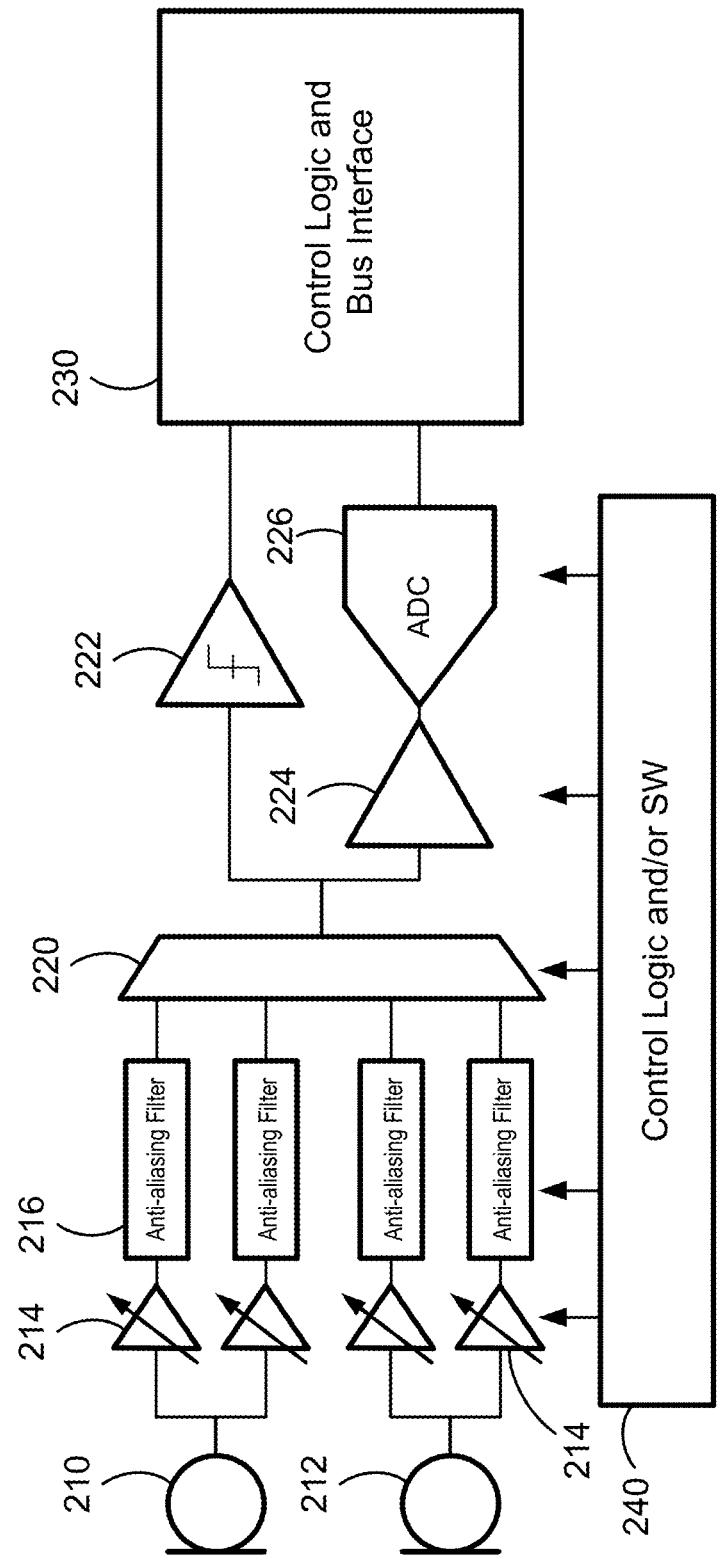
FIG. 2 is a block diagram of an example low power dynamic analog to digital converter in the low power microcontroller system in FIG. 1.

FIG. 2 shows an ADC architecture 200 of the low power ADC 160 that is capable of low power and high dynamic range operation. Though any analog sensor can be used, FIG. 2 shows an example pair of analog microphones 210 and 212 coupled to a series of programmable gain amplifiers 214. The outputs of the programmable gain amplifiers 214 are coupled to anti-aliasing filters 216, which are in turn coupled to the inputs of a multiplexer 220. The multiplexer 220 can select one input at a time to be routed to an output. The output of the multiplexer 220 is coupled to a comparator 222 and a buffer 224. The output from the buffer 224 is coupled to an ADC 226. The outputs of the ADC 226 and the comparator 222 are coupled to a control logic and bus interface 230 that allows the converted signal to be communicated to downstream components for further processing. All circuits such as the programmable amplifiers 214, filters 216, and multiplexer 220 are connected to control signals generated by a controller module 240. The controller module 240 may be implemented as either hardware-based logic or software. The following discussion describes variants of the ADC architecture 200 that includes some or all of these components.

In one variant of the example ADC architecture 200, at least one amplifier with programmable gain such as the programmable gain amplifiers 214 and one or more of the anti-aliasing filters 216 are coupled to the ADC 226 through an input buffer. In this example, the ADC 226 is preferably a SAR ADC, although other ADC architectures can be used. The buffer is designed to have a high bandwidth to enable fast settling and is enabled only during a short tracking window (e.g., 0.5 µs). The ADC, buffer, and related circuitry can be placed in a low power or power gated mode for most of the time and then only briefly powered up in a normal operation mode during sampling. This enables considerably lower power consumption than converters in which the circuitry remains powered up in a normal operation mode at all times.

Two or more inputs may be coupled to the ADC 226 through a multiplexer such as the multiplexer 220. The control logic or software of the controller module 240 can select one input at a time and then provide the selected input to the ADC 226 for sampling. If the ADC 226 runs at a sufficiently high sampling rate, then multiple channels can be similarly sampled at high rates. For example, in the case of 8 channels being sampled at 48 kilosamples per second (kSps) each, a Nyquist rate ADC like a SAR ADC could cycle through each of the 8 channels by running at an aggregate sampling rate of 384 kSps. In this example, the ADC 226 runs continuously and remains constantly powered on. Alternatively, the ADC 226 could sample at an even higher sampling rate while maintaining the same 48 kSps sampling rate per channel and then transition to low power or power gated mode between each conversion (along with any coupled buffers or other circuitry). For example, at an aggregate sampling rate of 3Msps, the ADC 226 requires only 2.7 µs (plus transition time) to sample all 8 channels. Sampling all 8 channels 48,000 times per second requires only 0.13 s in total. The ADC and related circuitry can thus be placed into a low power or power gated mode between samples, for a total of (1-0.13)=0.87 s in low power mode.

It is desirable for the gain on the amplifiers 214 to be changed dynamically to maximize dynamic range and for a variety of other reasons. However, ADC output characteristics can be corrupted if this gain change is handled in the wrong way. For example, if the ADC is monitoring a microphone, changing gain at the wrong time can lead to the introduction of pop and click sounds in the digital audio stream output by the ADC. It is therefore critical to change gain in a controlled manner. This can be done by synchronizing gain changes to ADC samples and conditions. For example, gain may be changed only when the signal value is at or around a zero value (i.e., zero detection). Alternatively, gain could be changed once the output is detected to be saturated or near saturation (i.e., saturation detection). A set threshold or multiple set thresholds could also be used to detect the correct time to change gain (i.e., a comparison operation or a window comparison operation). In all cases, it is desirable to change gain between ADC sampling operations to avoid disrupting the analog-to-digital conversion event. The gain adjustment process can be controlled by dedicated control logic (which generally offers minimum power at the expense of flexibility) or by software (which offers flexibility at the expense of power). In an ADC architecture containing multiple channels and multiple amplifiers, the gain of each amplifier for a channel is preferred to be independent but can also be shared between channels.

It is particularly desirable to change gain when the output is close to saturating (i.e., when the ADC output value is close to the maximum or minimum value detectible by the ADC). It is preferable to have a "fast attack" automatic gain control methodology in which the gain is changed as quickly as possible once saturation is detected as happening or imminently happening. The fast attack can be achieved either through hardware logic control or via software control. If it is handled via software control, it is desirable for a saturation detector hardware block to trigger an interrupt signal which is monitored by a power management unit or interrupt management unit that causes a host MCU to execute software (e.g., an interrupt handler and related code) to quickly adjust gain. To minimize the response time, and ensure a fast attack, the interrupt can be treated as a high priority interrupt relative to other interrupts in the system. A fast attack automatic gain control methodology is often coupled with a "slow release" in which the gain is returned to its previous state before saturation after significant time spent below or above the saturation threshold. A fast attack coupled with a slow release ensures safe operation and can avoid saturation entirely.

In another variant, one or more anti-aliasing filter outputs can be coupled to a comparator with programmable threshold (in addition to or instead of the ADC). Alternatively, other filters may also be coupled to the comparator with a programmable or set threshold. Comparators generally consume far less power than ADCs, so it may be desirable to use the comparator to monitor input levels for most of the time and then only wake up the ADC when a signal of interest is detected by the comparator. For example, the comparator can monitor microphone signal levels with very little power when there is silence or little sound. Significant sound or a voice causes the microphone signal to change significantly. This change causes the comparator output to flip. Control logic or software can then automatically enable the ADC to begin sampling at high frequency. In one example, the changing of the comparator output causes an interrupt signal to change state. That interrupt signal is monitored by a power management unit or interrupt management unit that causes a host MCU to execute software (e.g., an interrupt handler and related code) that moves the ADC from a low power operating mode to a normal operating mode that is capable of sampling at high frequency.

In another variant of the ADC architecture 200, an input channel may be monitored by at least two programmable gain amplifiers. When desirable, the two or more programmable gain amplifiers can monitor the input channel with similar or different gain settings to achieve multiple possible benefits. For example, the dynamic range of the ADC can be extended by monitoring the input channel at two different gain levels. A first amplifier can be set to a low gain value that is unlikely to cause saturation on the ADC, and a second amplifier can be set to a higher gain value that can detect smaller signals but is at risk of causing saturation in the ADC. The ADC can convert the outputs of both amplifiers to a digital value (a first output coming from the first amplifier and a second output coming from the second amplifier), and then a hardware control block or software-based algorithm can choose the desired digital output (a first digital output from the first amplifier and a second digital output from the second amplifier) based on some criteria. It is preferable to choose the second digital output (from the second amplifier with higher gain value) to maximize dynamic range. However, in the event that the second digital output is detected to saturate or be near saturation, the first digital output may be selected.

In another example, the dynamic range of the ADC can be extended by monitoring the input channel with two or more different amplifiers at the same gain level. The ADC can convert the output of each amplifier to two or more digital values, and then these digital values can be used to calculate a single value with higher dynamic range than any of the amplifiers could achieve alone. For example, the average of the two or more digital values offers a higher dynamic range than the digital values from a single amplifier. The calculation (e.g., the averaging) can be accomplished with either hardware logic or software running on a processor.

The use of at least two programmable gain amplifiers to monitor a single input channel can also be used to reduce DC offset or DC gain error. Using several samples from a moderately time-varying input signal, the DC offset of each channel can be computed by low-pass filtering the digital samples, since the input voltage signal has zero DC offset when AC coupled to the input of the PGA. The relative gain G between the two channels CH_0[n] and CH_1[n] can be computed by ensuring:

$$G*(CH\_0[n]-DC\_0)=(CH\_1[n]-DC\_1)$$

where the DC_0 and DC_1 represent the estimates of the DC offset of CH_0 and CH_1, respectively. The value of G may also be iteratively computed to minimize the error:

$$E=G*(CH\_0[n]-DC\_0)-(CH\_1[n]-DC\_1)$$

where G can be adjusted following the gradient of the error, which avoids using division which can be compute-intensive when compared to multiplication. The value of G, when compared to the target, nominal analog gain difference, may be used to calibrate the relative gains across various hardware gain configurations, so that actual hardware gains are known rather than the nominal gains. The programmable hardware gain operates using two separate gain stages that can be configured separately and have overlapping nominal gains. In all cases, sensor inputs and subsequent signal chains can be single ended or differential.

Negative Temperature Coefficient Buck Converter

Voltage supplies for the microcontroller system 100 require efficient voltage supply circuits to maximize power efficiency. A DC DC step down converter, alternatively called a buck converter, typically requires a voltage reference to set the DC level that a buck regulator must generate. The voltage reference may be the same as the required DC level, or an attenuated version of the required level.

Figure 3:
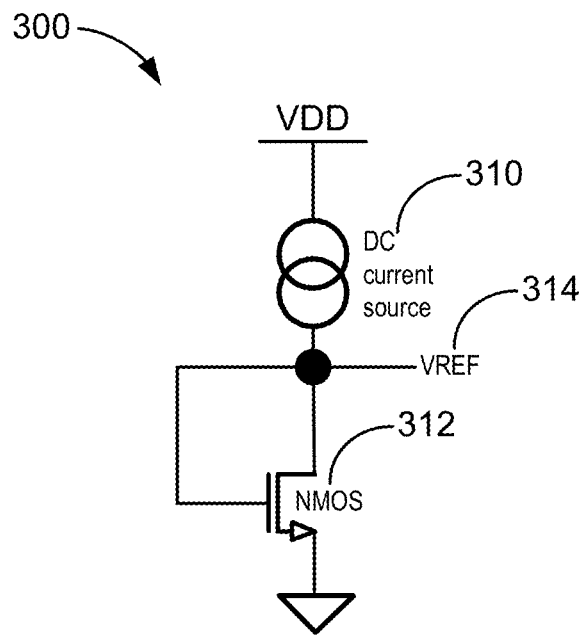
FIG. 3 is a circuit diagram of a negative temperature coefficient voltage reference source for an example buck converter.

For sub threshold operation or near-threshold operation, a negative temperature voltage rail may be used to aid circuit timing closure. FIG. 3 shows a negative temperature coefficient voltage reference circuit 300 for providing a reference voltage. The negative temperature voltage reference circuit 300 includes a DC current source 310. The DC current source 310 is coupled to a diode connected NMOS transistor 312. The circuit 300 includes a voltage reference output 314. The voltage reference output 314 couples the DC current source 310 between the gate of the NMOS 312 and the source of the NMOS 312. The reference circuit 300 is further described in U.S. Pat. No. 10,013,006, titled "LOW POWER TUNABLE REFERENCE VOLTAGE GENERATOR," hereby incorporated by reference.

The diode connected NMOS transistor 312, when operating in subthreshold, generates a Vgs voltage that decreases as temperature increases. The change in the output voltage 314 as a function of temperature (the tempco) is a function of the length of the diode connected transistor. Multiple transistors may be placed in series to form this diode transistor, and the effective diode transistor length is simply the sum of all units. By shorting across unit elements, the length can be adjusted and the tempco changed accordingly. Although an NMOS transistor 312 is used in this example, it should be understood that a circuit with a similar function may be used with a diode connected PMOS transistor with the current source going to ground. In such a PMOS based circuit, the circuit in FIG. 3 would have the PMOS transistor on top and the current source on the bottom. This creates a voltage reference relative to VDD rather than ground.

Figure 4:
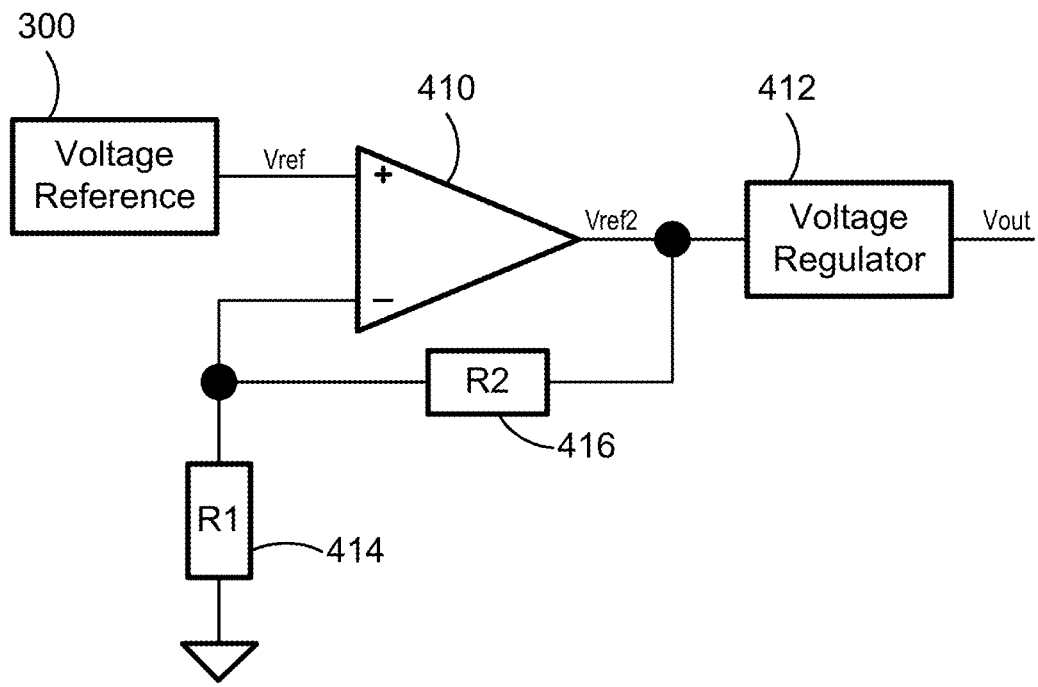
FIG. 4 is a block diagram of an example buck converter using the example negative temperature coefficient voltage reference in FIG. 3 for the example low power microcontroller system in FIG. 1.

FIG. 4 shows a circuit diagram of the negative temperature coefficient circuit 300, a programmable gain amplifier 410 with a voltage regulator 412 such as a buck converter. The negative temperature coefficient circuit 300 generates a first reference signal (Vref1) which is connected to the positive input of the gain amplifier 410. The gain amplifier 410 has an output that is a second reference signal (Vref2). The negative input of the gain amplifier 410 is tied through a first resistor 414 to ground. The output of the gain amplifier 410 is tied to one end of a second resistor 416. The other end of the second resistor 416 is also tied to the negative input of the gain amplifier 410.

The circuit in FIG. 4 allows the negative temperature coefficient circuit 300 in FIG. 3 to create a programmable negative temperature coefficient voltage reference with the gain amplifier 410 for the voltage regulator 412, which is a buck converter in this example. It is to be understood that the adjustment circuit in FIG. 4 may be used for any type of voltage regulator/converter such as a low dropout (LDO) regulator. The ratio of Vref2 to Vref1 can be adjusted via trim, by changing the values of either the second resistor 416 or the first resistor 414. In this example, the resistors 414 and 416 represent resistor network circuits that include unit resistors wired in series with switches that can short across a number of resistors. For example, one of the resistor network circuits may have 128 units each of R resistance value, with 7 switches to short out 1/2/4/8/16/32/64 units allows a resistor value of 1R to 128R to be created.

Low Power and High Performance Serial Interface

Another feature of the microcontroller system 100 is the I2C/SPI slave module 166 in FIG. 1A. The I2C/SPI Slave (IOS) module 166 provides an interface which allows an external Master (the Host) on either interface to transfer data to and from the microcontroller system 100. This data is read from or written to an internal memory within the IOS module 166. In this example, the internal memory in the IOS module 166 is 256 bytes, but other sizes of memory may be used. It is often desirable for the host to be able to transfer larger blocks of data within a single operation, and this requires special functions in the IOS module 166 because the CPU 110 of the microcontroller system 100 must move data between the small memory in the IOS module 166 and the large system memory such as the SRAM 170.

For read transfers from the microcontroller system 100 to the external Host, the IOS module 166 includes a FIFO function which tracks the number of bytes which have been transferred. The IOS module 166 may be configured to interrupt the CPU 110 when the number of bytes reaches a certain value, and software running on the CPU 110 can move additional data from the main memory to the IOS memory, effectively enabling an infinitely long transfer.

The above approach does not work for transfers from the Host to the microcontroller system 100, so an alternative implementation is provided for these write transfers. In both I2C and SPI protocols, there is an "address pointer" held in the Slave device which allows the Host to write to specific addresses. When a byte is written, the address pointer is typically automatically incremented to the next address. The address pointer is selecting a specific location within the local memory of the IOS module 166, which would normally limit the transfer to no more than the number of bytes in the local memory, which in this example is 256 bytes. However, in this example, the address pointer is written with 0 when the transfer occurs and the current address pointer contains the address of the highest byte in the memory, in this case 255. Thus the transfer wraps around, and can be infinitely long.

As with the read transfer, the CPU 110 must be interrupted within the transfer so that software can move data from the IOS local memory of the IOS module 166 to the main memory SRAM 170. Thus the disclosed microcontroller system 100 includes a mechanism which allows the IOS module 166 to be configured to generate an interrupt on writes to certain addresses, i.e., address pointer values. By allowing interrupts at multiple address pointer values to be configured, software can select how many locations in the local memory are available for Host transfers, and can thus ensure that the memory will not fill up and create an overflow condition before software can move data out of the local memory to the main memory. It is possible to allow interrupts on any address pointer value, although for logic simplification only a subset of addresses can be selected.

Slave devices often require some special address pointer locations which access hardware functions, such as generating an interrupt to the CPU 110. In the IOS memory the addresses between 0x78 and 0x7F are used for this purpose, because the SPI protocol only supports 7-bit initial address pointer values. The address pointer may be designed to wrap from 0x77 to 0x0, but that would limit the IOS local memory to 120 bytes. Since larger local memories are desired, the example IOS module 166 specifies that the address pointer increments from 0x77 to 0x80, thus bypassing the special address area. This allows any size local memory to be used while supporting transfers of any length.

Normally the address pointer directly addresses the local memory, i.e. the location in the memory where data is written is the value of the address pointer. However, since the address pointer increments from 0x77 to 0x80, a "hole" would be introduced in the local memory, which adds complexity to the software when it is transferring data to main memory. To avoid this problem, the example IOS module 166 specifies that when the address pointer is above 0x80 the location in the local memory where the data is written is the address pointer minus the number of special addresses. In the example microcontroller system 100 there are eight special addresses. This operation is referred to as address mapping. Any number of special addresses may be supported up to a limit such as 127 special addresses, as there must be at least one address which is not mapped. Note that the address mapping function is not required, and software could handle the mapping, but it simplifies this critical software.

Security Module

Figure 5:
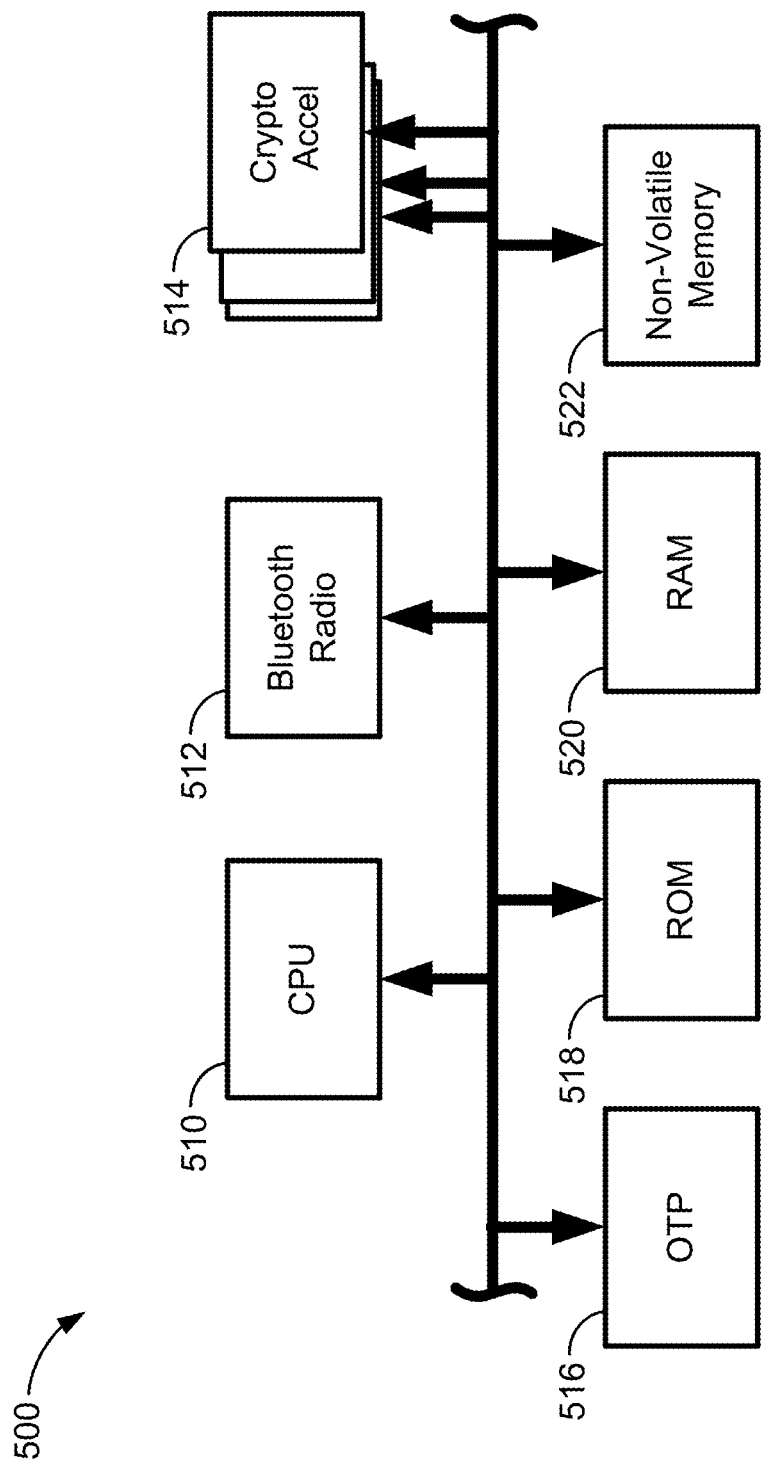
FIG. 5 is a block diagram of an example secure system for secure boot-up of the example microcontroller system in FIG. 1.

The example microcontroller system 100 includes a method and apparatus for low overhead, robust security implementation in embedded devices to support secure boot, secure debug, secure over-the-air and wired updates, secure key management and secure patching. FIG. 5 is a block diagram of a system 500 that includes a CPU 510, a Bluetooth radio 512, one or more cryptographic accelerator(s) 514, a series of one-time-programmable memory elements 516, a ROM 518, a RAM 520, and a non-volatile memory 522.

A partition of secure and non-secure is defined such that the secure partition is guaranteed secure through a series of steps to bind the environment to an established root-of-trust. The non-secure partition is assumed to be fully compromised. The maintenance of the isolation between the secure and non-secure partitions is maintained via hardware that cannot be compromised and sequences in time. At initial device boot, all external access to the processor 110 in FIG. 1 is locked via hardware locks and the processor is set into secure mode. While in secure mode, a physical hardware state is set and propagated to all elements included in or having influence on the secure boot process to indicate a secure operating mode. The CPU 510 starts execution from the ROM 518 which performs the initial system check and validates/authenticates the initial boot code called Secure Boot ROM (SBR). Once validated/authenticated to be bound to the silicon manufacturer, the CPU 510 switches execution to the SBR. The system remains in secure operating mode, allowing SBR to have access to all available assets. The SBR performs additional services to support secure debug through authentication/validation of debug certificates. Upon successful authentication/validation of debug certificate(s), the appropriate security policies are applied to the device allowing certain assets to be made available. The SBR validates/authenticates the next level firmware called a Secure Boot Loader (SBL). Upon validation/authentication, the SBR passes execution to the SBL. Prior to handoff, the operating state of the device is switched to reflect that the operating mode is still secure but is executing within a mutable environment. This allows the system resources to lock/unlock certain assets as directed by the security policy to ensure the root-of-trust is maintained.

The SBL performs additional security services such as checking for a pending over-the-air or wired firmware update. If available, the SBL performs the validation/authentication and optional decryption of the firmware updates and checks whether the installation of the new firmware is complete/successful. If the update successful, a reboot is initiated maintaining the secure operating mode and preventing any intervention.

One of the updates could be for secure patching. Secure patches can be downloaded similar to any other firmware update over-the-air or via a wired communication interface. These patches are validated/authenticated to ensure they are secure. Once validated/authenticated, the SBL performs the prescribed patch update which allows for in-the-field updates to device trim values owned by the silicon manufacturer. Once patch updates, if applicable, are complete, a device reboot is performed, again, maintaining the secure state of the device. If no patch update is required, the SBL continues to validate/authenticate the next level of firmware which can be either the secondary secure boot loader (Secondary SBL) stored in the ROM 518 or the main firmware/firmware bundle. The SBL validates/authenticates the firmware bound to the OEM root-of-trust or to the silicon manufacturer root-of-trust depending on the device configuration. This allows binding to either a separate/isolated entity or uniform entity. Upon completion, the SBL switches operating mode either to a secure OEM state (if the secondary SBL is required) or to run mode and hands off execution to the respective firmware.

The Secondary SBL can optionally perform additional firmware validation/authentication or other system security policy enforcement prior to handing off control to the executed main firmware.

During the secure boot flow, various key assets are required for validation/authentication/decryption. The keys are partitioned between silicon manufacturer assets and OEM assets. The partitioning is enforced using hardware and security state of the device such that firmware and hardware blocks requiring access are allowed and only the assets required for the specific function is allowed. All other key assets are prevented. The key assets are further cryptographically wrapped to ensure protection against probing. Key assets are also masked/destroyed as part of a debug or a Return Merchandise Authorization (RMA).

During non-boot time (runtime), a specific set of keys are made available to firmware or hardware using a separate key programmed by either the silicon manufacturer or OEM at manufacturing allowing runtime access. These key banks can further be locked from access preventing access until a reboot.

Figure 6:
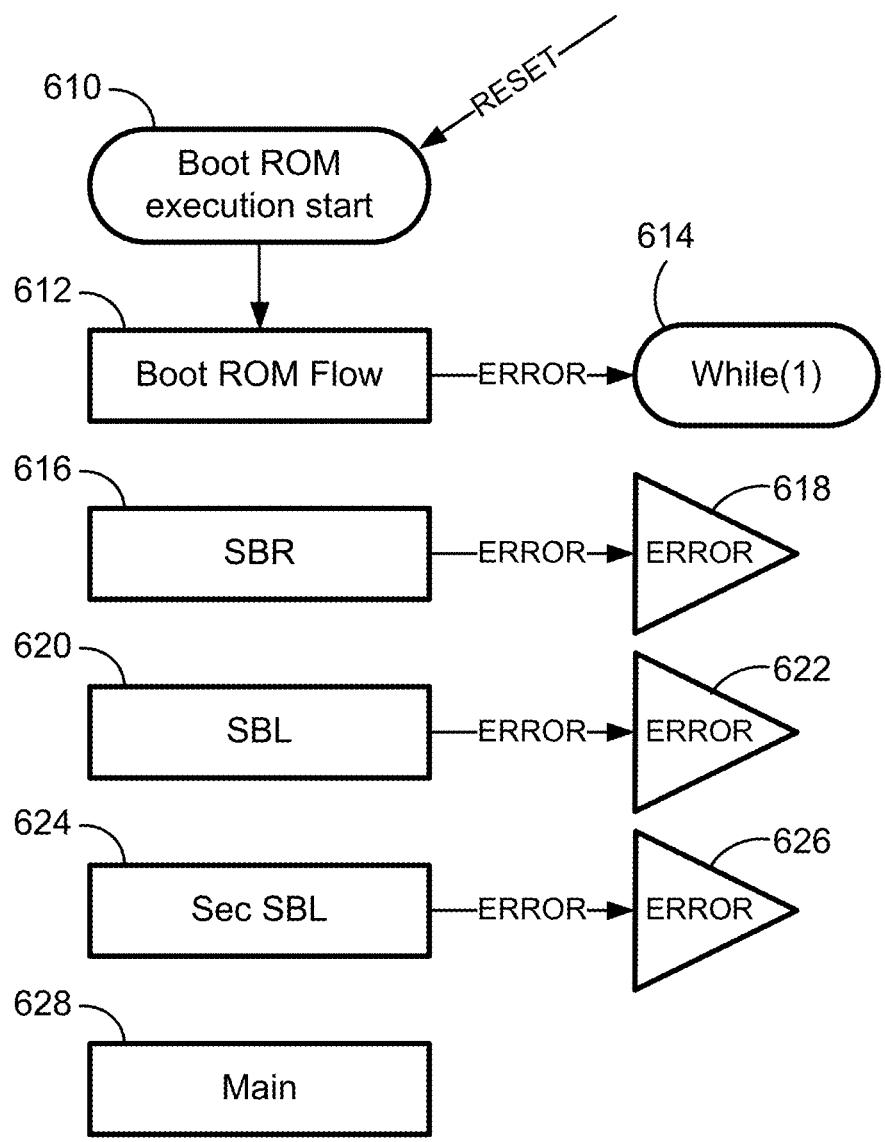
FIG. 6 is a flow diagram of the secure boot up process performed by the example microcontroller system in FIG. 1.

The flow diagram in FIG. 6 is representative of example machine readable instructions for a secure boot-up. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowchart illustrated in FIG. 6, persons of ordinary skill in the art will readily appreciate that many other methods of implementing the example machine readable instructions may alternatively be used. For example, the order of execution of the blocks may be changed, and/or some of the blocks described may be changed, eliminated, or combined.

The CPU 510 starts execution from the ROM 518 (610). The initial system check occurs (612). If an error is encountered (614), the system check will repeat. If the check is successful, the validation/authentication of the SBR is performed (616). If the validation/authentication fails, the routine generates an error (618). After the SBR is successfully authenticated, execution is switched to the SBR and the system remains in secure operating mode allowing SBR to have access to all available assets. The SBR performs additional services to support secure debug through authentication/validation of debug certificates.

The SBR validates/authenticates the Secure Boot Loader (SBL) (620). If the SBL is not successfully authenticated, the routine generates an error (622). Upon successful validation/authentication, the SBR passes execution to the SBL. The SBL performs additional security services such as checking for a pending over-the-air or wired firmware update.

The SBL continues to validate/authenticate the next level of firmware such as the secondary secure boot loader (Secondary SBL) (624). Alternatively, the next level of firmware may be the main firmware/firmware bundle. The SBL validates/authenticates the firmware bound to the OEM root-of-trust or to the silicon manufacturer root-of-trust depending on the device configuration. In this example, the SBL validates/authenticates the secondary SBL. If the authentication fails, the routine generates an error (626). Upon successfully, authentication, the Secondary SBL can optionally perform additional firmware validation/authentication or other system security policy enforcement prior to handing off control to the main firmware (628).

Flexible and Low Power Cache Memory Architecture

Microcontrollers and other embedded processors such as the microcontroller system 100 require an increasing amount of memory as software becomes more complex and as the number of peripherals (e.g., ADCs, GPUs, USB ports, memory devices etc.) grows. To manage this challenge, many chips employ a memory hierarchy that includes on-chip tightly coupled memories (TCMs) that can be accessed in a single clock cycle, on-chip system memories that can typically be accessed in two or more clock cycles, and serial or parallel interfaces to off-chip memories that often take many cycles to access. Cache memories can be used to reduce the number of cycles required to access system memories and off-chip memories. The example microcontroller system 100 includes an example flexible and low power cache memory architecture shown in FIG. 7.

Figure 7:
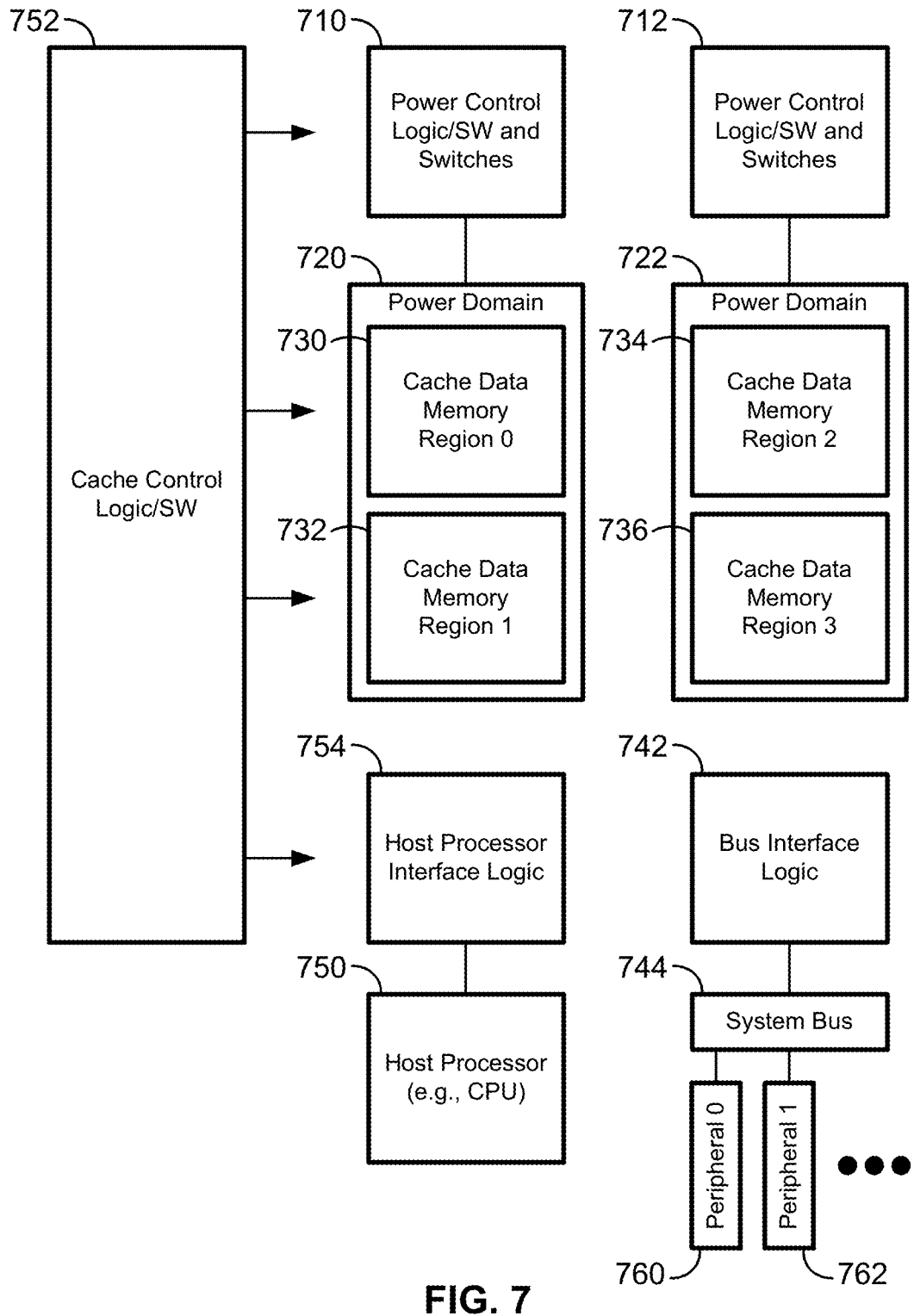
FIG. 7 is a block diagram of a flexible and low power cache memory architecture for the example microcontroller system in FIG. 1.

FIG. 7 shows two power control modules 710 and 712 that may be power control logic/software and switches. The power control modules 710 and 712 control two respective power domains 720 and 722. Each of the power domains 720 and 722 have various cache data memory regions. Thus, the power domain 720 includes cache memory regions 730 and 732. The power domain 722 includes cache memory regions 734 and 736. The cache architecture includes multiple cache data memory regions such as the regions 730, 732, 734, and 736 that store data read from a peripheral of a group of peripherals 740. In this example the peripherals 740 may be on-chip internal system memory to store data, such as a static random access memory (RAM) or a non-volatile memory (NVM). Alternatively, a peripheral interface such as a serial interface that reads data from an off-chip peripheral may be provided. Thus, the peripheral device itself may be off chip and may communicate to the components on the chip via the peripheral interface. Although only two memory regions and two power domains are shown in this example, the principles herein can be applied to any number of power domains with any number of cache memory regions.

Access to each of these memory regions 730, 732, 734, and 736 is controlled by the Cache Control Logic/SW block 752, which can enable access to each memory region 730, 732, 734, and 736, either from the Host Processor 750 via the Host Processor Interface Logic 754 or from any of the group of peripheral devices 740 via a system bus 744 and its associated bus interface logic 742. The cache control logic/SW 752 may be configured to allow access from the host processor 750 or any of the peripheral devices 740 to each of the memory regions 730, 732, 734, and 736. Access means that the host processor 750 or peripheral device 740 may transfer data to or from any location in any of the memory regions 730, 732, 734, and 736. The data is passed through bus interface logic 742 to a system bus 744 to the peripherals 740. The cache data memory regions such as the regions 730, 732, 734, and 736 are grouped into the power domains 720 and 722. Each power domain contains one or more cache data memory region and may be power gated independently from other power domains using the power control logic (or control SW) and power switches in the control modules 710 and 712.

As explained above, the peripherals 740 may include a peripheral device 0 (760) that is on chip as well as other peripherals such as a peripheral device 1 (762) that may be off chip. As explained above the bus interface logic 742 serves as a peripheral interface to the on chip peripheral devices such as the peripheral device 760. A peripheral communication interface 756 allows communication with off chip peripherals such as the peripheral device 762. A peripheral could be, for example, a memory device such as a random access memory (RAM) supporting read and write operations, a non-volatile memory (NVM) such as flash memory which is generally only read, or a solid state drive (SSD) memory which holds large amounts of data which may be read or written. Such data may include software that may be executed periodically by the host processor 750 and therefore may be made available from an on chip memory device peripheral or an off chip memory device peripheral.

In normal operation, a host processor 750 causes the power control logic (or control software) modules 710 and 712 to power up a desired set of cache data memory regions and power down any unused regions in the power domains 720 and 722. Powered down regions may have the capability to maintain data during the powered down state, or may lose all data when powered down, but in each case the data is not accessible when the memory region is powered down. The host processor 750 then issues read requests to a cache control logic (or software) 752 through the host interface logic 754. If the data requested is already present in one of the cache data memory regions, then the cache control logic 752 will return the requested data to the host processor 750. If the requested data is not present in one of the cache data memory regions, then the cache control logic 752 will cause the desired data to be fetched from one or more peripherals 740 through the system bus 744. Once the data has been fetched from the targeted peripheral, it will be stored in one of the cache data memory regions and may also be returned to the host processor 750. Data may be written directly to a peripheral from the host processor 750, or such data may be written to a powered up cache data memory region and subsequently transferred to the peripheral by the cache control logic.

Figure 8A:
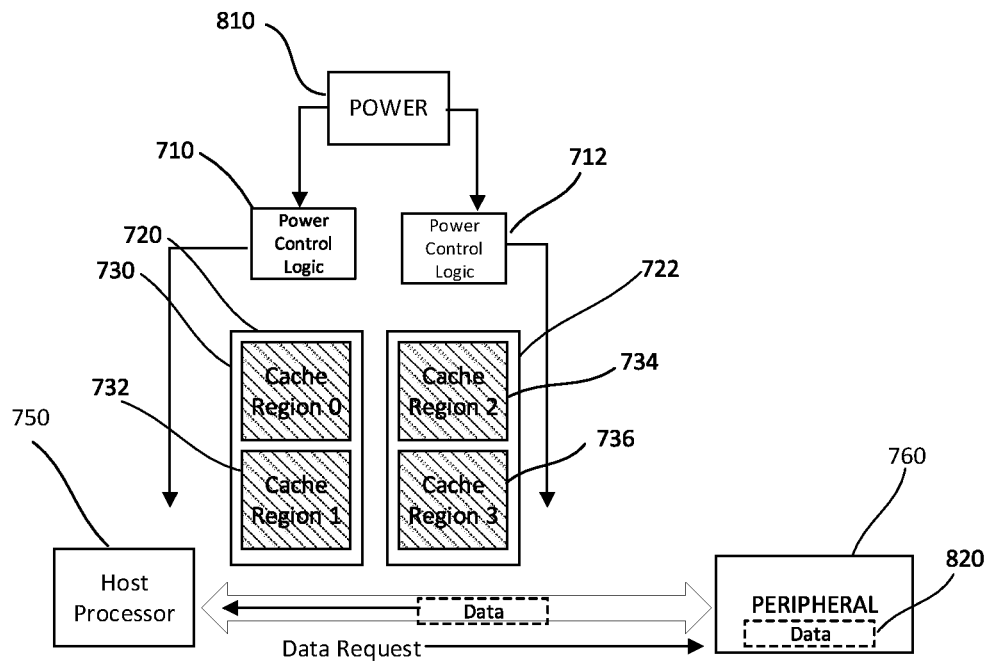
FIG. 8A is a diagram showing the requesting of data from the host processor in FIG. 7.
Figure 8B:
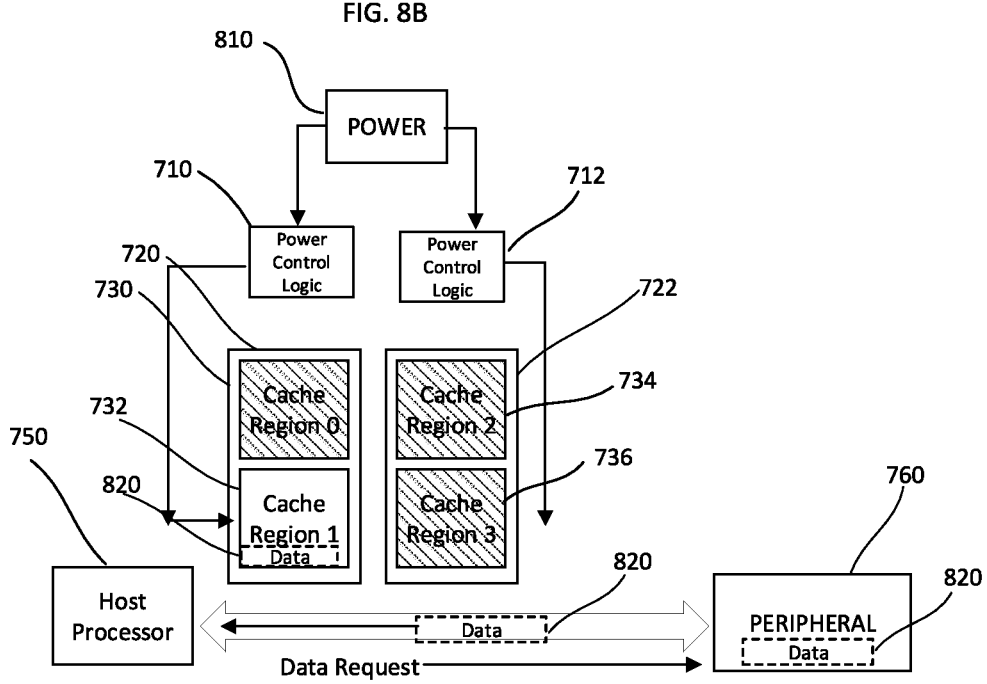
FIG. 8B is a diagram showing the activation of a memory region for storage of data in the cache memory architecture in FIG. 7.

FIGS. 8A-8B shows the process for activation of memory regions when data is requested by the host processor 750. FIGS. 8A-8B shows certain components from FIG. 7 for purposes of explanation. In FIG. 8A, voltage from a power source 810 is controlled by the power control logic 710 and 712. In this example, initially the memory regions 730, 732, 734, and 736 are idle, and thus the power control logic 710 and 712 does not connect the power source 810. Data 820 such as software is requested by the host processor 750 via the system bus 744. In this example, the data 820 is stored in the peripheral 760, which is a memory device.

The bus interface logic 742 then sends the data request to the peripheral 760 via the cache control logic 752. The peripheral 760 sends the requested data 820 over the system bus 744. The cache control logic 752 then commands the control logic 710 to activate the memory region 730 by connecting the memory region 730 to the power source 810. As shown in FIG. 8B, the other memory regions 732, 734 and 736 remain powered down. The data 820 is stored in the now powered memory region 730 and is thus available to the host processor 750. Power is saved as the other memory regions 732, 734 and 736 remain powered down, but the data 820 is available subsequently to the host processor 750 from the active memory region 730.

The cache architecture may map many different pieces of data into each location inside a particular cache data memory region. Two different pieces of data can thus "collide" in a single location, which causes one of those pieces of data to be over-written. The next time that particular data is requested, it must be re-fetched from the targeted peripheral at a cost of many clock cycles (and significant power). To prevent this kind of "cache thrashing," individual cache data memory regions can be permanently or temporarily mapped to one or more peripherals using the cache control logic (or software). For example, in FIG. 7, the peripheral 0 (760) of the peripherals 740 can be mapped to the cache data memory region 0 (730) while the peripheral 1 (762) can be mapped to the cache data memory regions 1, 2, and 3 (732, 734, and 736). The data fetched from peripheral 0 (760) will only be stored in the cache data memory region 0 (730). The data fetched from peripheral 1 (762) will only be stored in cache data memory regions 1, 2, and 3 (732, 734, and 736). This mapping might be created if the data from peripheral 0 is known to be used for only a short time, so that it may be removed from the cache to make room for new data with no performance impact, but the data from peripheral 1 is known to be used for a longer time so that retaining more of it in the cache is beneficial. By mapping the peripherals to different cache regions, the peripheral 0 data will not consume memory reserved for the peripheral 1 data, so that the memory utilization may be controlled by software. Once the data from peripheral 0 or peripheral 1 is no longer required, the assigned memory regions may be powered down to save power. The mapping can be set statically or can be changed dynamically depending on workload or software selection.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware, generalized hardware made specialized by the execution of software thereon that enables the hardware to perform specific function, software stored on a computer-readable medium, or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A system on chip comprising:
   a peripheral interface coupled to a peripheral device storing data;
   a plurality of data memory regions, each including a cache memory, the data memory regions coupled to the peripheral device;
   a host processor operable to control power to each of the plurality of data memory regions, wherein the host processor is operable to power on any of the plurality of data memory regions and power down any unused data memory regions of the plurality of data memory regions, wherein any of the data memory regions can store data when powered down; and
   a cache control logic operable to receive a data request from the host processor for the data stored on the peripheral device, the cache control logic requesting the data from the peripheral device, and wherein the host processor powers on at least one of the plurality of data memory regions and exclusively maps the at least one of plurality of data memory regions to the peripheral device, wherein the cache control logic prevents storing data requested from another peripheral device to the mapped at least one of plurality data memory regions, receives the requested data from the peripheral device, stores the requested data in the cache memory of the at least one of the data memory regions, and powers down the at least one of the data memory regions, and wherein at a subsequent time, the cache control logic receives another data request from the host processor for the data stored on the peripheral device, wherein the host processor powers on the cache memory storing the requested data, and the host processor receives the requested data from the cache memory.

2. The system on chip of claim 1, wherein the peripheral device, the host processor, control logic and plurality of memory regions are on a chip.

3. The system on chip of claim 1, wherein the peripheral device is external to a chip holding the host processor, control logic, peripheral interface, and plurality of memory regions.

4. The system on chip of claim 1, wherein the peripheral device is an internal system memory storing the data.

5. The system on chip of claim 1, wherein the peripheral device is an external memory device.

6. The system on chip of claim 1, wherein the map is changed to associate the peripheral device to another one of the plurality of data memory regions.

7. The system on chip of claim 6, wherein the change occurs based on the utilization of the memory region by the peripheral device.

8. The system on chip of claim 1, wherein the peripheral device is one of a random access memory (RAM), a non-volatile memory (NVM), or a solid state drive (SSD).

9. A method of selectively powering cache memories in a plurality of data memory regions, each including a cache memory, the data memory regions coupled to a peripheral device, the method comprising:
   receiving a data request from a host processor for data stored on the peripheral device;
   powering on at least one of the plurality of data memory regions via control logic;
   transferring the requested data from the peripheral device to the host processor;
   storing the requested data on the cache memory of the at least one powered data memory region;
   powering down the at least one data memory region, wherein the at least one data memory region stores the data when powered down;
   exclusively mapping the at least one of plurality of data memory regions to the peripheral device, wherein data requested from another peripheral device is prevented from being stored to the mapped at least one of plurality data memory regions;
   receiving a subsequent data request for data stored on the peripheral device;
   powering up the at least one data memory region; and
   accessing the requested data from the cache memory of the at least one powered data memory region.

10. The method of claim 9, wherein the peripheral device, the host processor, control logic and plurality of memory regions are on a chip.

11. The method of claim 9, wherein the peripheral device is external to a chip holding the host processor, control logic and plurality of memory regions.

12. The method of claim 9, wherein the peripheral device is an internal system memory storing the data.

13. The method of claim 9, wherein the peripheral device is an external memory device.

14. The method of claim 9, further comprising powering down the other data memory regions.

15. The method of claim 9, further comprising changing the map to associate the peripheral device to another one of the plurality of data memory regions.

16. The method of claim 15, wherein the change occurs based on the utilization of the memory region by the peripheral device.

17. A non-transitory computer readable medium having stored thereon software instructions that, when executed by control logic, cause the control logic to:
   receive a data request from a host processor;
   power on at least one of a plurality of data memory regions, wherein each of the plurality of memory regions include a cache memory, and wherein each of the data memory regions are coupled to a peripheral device;
   transfer the requested data from the peripheral device to the host processor;
   store the requested data on the cache memory of the at least one powered data memory region;
   exclusively map the at least one of plurality of data memory regions to the peripheral device, wherein data requested from another peripheral device is prevented from being stored to the mapped at least one of plurality data memory regions;
   power down the at least one data memory region, wherein the at least one data memory region stores the data when powered down;
   receive a subsequent data request for data stored on the peripheral device;
   power up the at least one data memory region; and
   access the requested data from the cache memory of the at least one powered data memory region.

18. The system on chip of claim 1, wherein the cache control logic is further operable to receive a data request from the peripheral device for another data stored on the host processor, the cache control logic requesting the another data from the host processor, and wherein the host processor powers on at least one of the plurality of data memory regions, writes the requested another data to the peripheral device, and stores the requested another data in the cache memory of the at least one of the data memory regions, and wherein at a subsequent time, the cache control logic receives another data request from the peripheral device for the another data stored on the host processor, wherein the host processor powers on the cache memory storing the requested another data, and the peripheral device receives the requested data from the cache memory.

19. The method of claim 9, further comprising:
   receiving a data request from the peripheral device for another data stored on the host processor;
   requesting the another data from the host processor;
   powering on at least one of the plurality of data memory regions;
   writing the requested another data to the peripheral device;
   storing the requested another data in the cache memory of the at least one of the data memory regions;
   receiving another data request for the another data stored on the host processor at subsequent time;

powering on the cache memory storing the requested another data; and the peripheral device receiving the requested data from the cache memory.

\* \* \* \* \*